(12) United States Patent
Barron et al.

(10) Patent No.: US 7,004,511 B2
(45) Date of Patent: Feb. 28, 2006

(54) PIPE COUPLING DEVICE

(75) Inventors: Dale Barron, Higdon, AL (US);
Stephen Revell, Albertville, AL (US);
Paul Gifford, Soddy Daisy, TN (US)

(73) Assignee: Mueller International, Inc.,
Portsmouth, NH (US)

( * ) Notice: Subject to any disclaimer, the term of this patent is extended or adjusted under 35 U.S.C. 154(b) by 0 days.

(21) Appl. No.: 10/815,275

(22) Filed: Apr. 1, 2004

(65) Prior Publication Data

US 2004/0239114 A1    Dec. 2, 2004

Related U.S. Application Data

(60) Provisional application No. 60/459,843, filed on Apr. 1, 2003.

(51) Int. Cl.
*F16L 17/00* (2006.01)
(52) U.S. Cl. .................... 285/342; 285/337; 285/342; 285/113
(58) Field of Classification Search ............... 285/342, 285/337, 341, 340, 343, 339, 232, 113, 374, 285/3
See application file for complete search history.

(56) References Cited

U.S. PATENT DOCUMENTS

| 4,569,542 | A | | 2/1986 | Anderson et al. | |
|---|---|---|---|---|---|
| 5,335,946 | A | * | 8/1994 | Dent et al. | 285/322 |
| 5,803,513 | A | | 9/1998 | Richardson | |
| 6,371,531 | B1 | * | 4/2002 | Robison | 285/342 |

* cited by examiner

*Primary Examiner*—Aaron Dunwoody
(74) *Attorney, Agent, or Firm*—Troutman Sanders LLP; Gerald R. Boss (57) ABSTRACT

The pipe coupling device includes a sleeve having an end adapted for receiving a pipe. The end has a sealing cavity defined between the outer surface of the pipe and the interior surface of the sleeve. A sealing gasket is adapted for arrangement within the sealing cavity of the sleeve for compression into sealing engagement with the pipe. A gripper ring is adapted for encircling the pipe and has a radial inner surface having a plurality of gripping members for gripping the pipe upon coaxial compression of the gripper ring. An intermediate ring is adapted for encircling the pipe between the sealing gasket and the gripper ring, and has a restraining member adapted for restraining the gripper ring to prevent the gripping members from gripping the pipe until after the sealing gasket is compressed into sealing engagement with the pipe. A locking ring adapted for communication with the gripper ring, and at least two tightening members are included for connecting the sleeve and the locking ring to compressibly secure the gripper ring, intermediate ring, and sealing gasket to the pipe, such that upon the tightening of the tightening members the sealing ring is compressed into sealing engagement followed by the gripping of the pipe by said gripper ring.

16 Claims, 7 Drawing Sheets

FIG 8

PIPE COUPLING DEVICE

This application claims priority from Provisional Application Ser. No. 60/459,843 filed Apr. 1, 2003 entitled "Pipe Coupling Device".

BACKGROUND OF THE INVENTION

1. Field of the Invention

The present invention relates generally to pipe couplings for fluid piping systems, and more particularly, to compression type couplings utilizing a gripper ring and sealing gasket where the gripper ring is prevented from locking the coupling in place before the seal is properly engaged.

2. Description of Related Art

In most fluid piping systems, couplings for pipe ends are employed in the construction of the system. As such, the overall reliability of the piping system often depends on the stability of the couplings used throughout the system. Accordingly, a number of different arrangements have been developed in an attempt to provide secure couplings between pipe ends. It is known to employ gripping members in order to prevent uncoupling of the pipe joints by longitudinal forces imposed on the coupled pipe sections. Other arrangements include a combination of rings and seals employed with compression type connections to hold pipe systems together. For example, a gland and gripping ring may be used in combination to position, compress, and seal a gasket about a pipe.

While the degree of pipe restraint on a coupled joint is critical, it is equally critical that an adequate gasket compression be achieved about the coupled pipe to insure a correct seal against leaks in the piping system. Accordingly, typical bolt type couplings having a gasket to effect sealing and a lock ring to restrain the coupled pipe against pull out are often utilized. In these couplings, a gripping ring is imposed on the pipe between the lock ring and the gasket to operationally grip the pipe prior to or simultaneous with compression of the gasket. The drawbacks of such couplings, however, are that they can result in an undetectable but inadequate gasket seal because the gripping ring often engages the pipe and locks it into place before the seal is properly actuated.

Accordingly, other compression couplings have been designed with various arrangements and parts to prevent gripper ring lock up prior to compression of the sealing gasket. For example, U.S. Pat. No. 4,569,542 discloses a bolt type coupling designed to provide clearance functions, so that gasket compression is achieved before the gripper ring effectively grips the pipe and locks the coupling in place when the bolt fasteners are tightened. U.S. Pat. No. 5,803,513, on the other hand, discloses the use of a plurality of skid pads strategically placed over the teeth of the gripping ring to prevent it from prematurely engaging the pipe before the compression of the accompanying gasket. While the couplings disclosed by U.S. Pat. Nos. 4,569,542 and 5,803,513 are useful for their intended purpose, they require additional or complicated arrangements of parts which may increase cost and/or hinder the ease of coupling installation.

What is needed then is a pipe coupling that is inexpensive and easy to install yet prevents the gripper ring from locking the coupling in place before the seal is properly engaged. It is to such a coupling that the present invention is primarily directed.

SUMMARY OF THE INVENTION

The present invention provides a pipe coupling device which is simple to install and provides a dependable fluid tight seal on a pipe. Briefly described, the pipe coupling device includes a sleeve having an end adapted for receiving a pipe. The end has a sealing cavity defined between the outer surface of the pipe and the interior surface of the sleeve. A sealing gasket is adapted for arrangement within the sealing cavity of the sleeve for compression into sealing engagement with the pipe. A gripper ring is adapted for encircling the pipe and has a radial inner surface having a plurality of gripping members for gripping the pipe upon coaxial compression of the gripper ring. An intermediate ring is adapted for encircling the pipe between the sealing gasket and the gripper ring, and has a restraining member adapted for restraining the gripper ring to prevent the gripping members from gripping the pipe until after the sealing gasket is compressed into sealing engagement with the pipe. A locking ring adapted for communication with the gripper ring, and at least two tightening members are included for connecting the sleeve and the locking ring to compressibly secure the gripper ring, intermediate ring, and sealing gasket to the pipe, such that upon the tightening of the tightening members the sealing ring is compressed into sealing engagement followed by the gripping of the pipe by the gripper ring.

DETAILED DESCRIPTION OF THE PREFERRED EMBODIMENTS

Referring now to the drawings, in which like numerals represent like parts throughout the several views, FIGS. 1 through 7 illustrate an embodiment of a pipe coupling device 10 of the present invention. As shown in the perspective view of FIG. 1, coupling device 10 is shown incorporated into a valve. Although so illustrated, it should be understood that coupling device 10 may be more broadly utilized for the joining of pipes in any situation, such as connecting a single pipe to a fire hydrant shoe, or connecting two pipes to a third through a T connection having the coupling device of the present invention incorporated therein. Coupling sleeve 14 and locking ring 22 cooperate with sealing elements (gripper ring 26, intermediate ring 36, and sealing gasket 38) to form a dependable and convenient fluid tight seal on a pipe 12.

Figure 1:
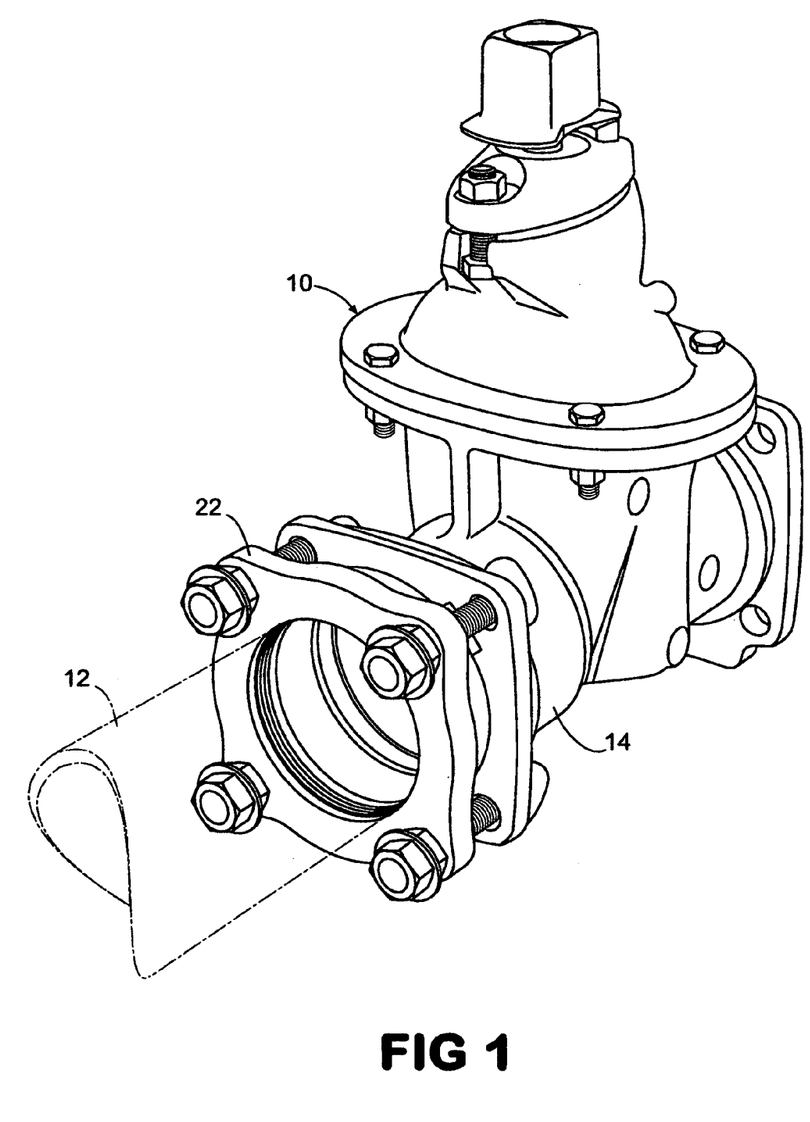
FIG. 1 is a perspective view of an embodiment of the pipe coupling device according to the present invention.
Figure 2:
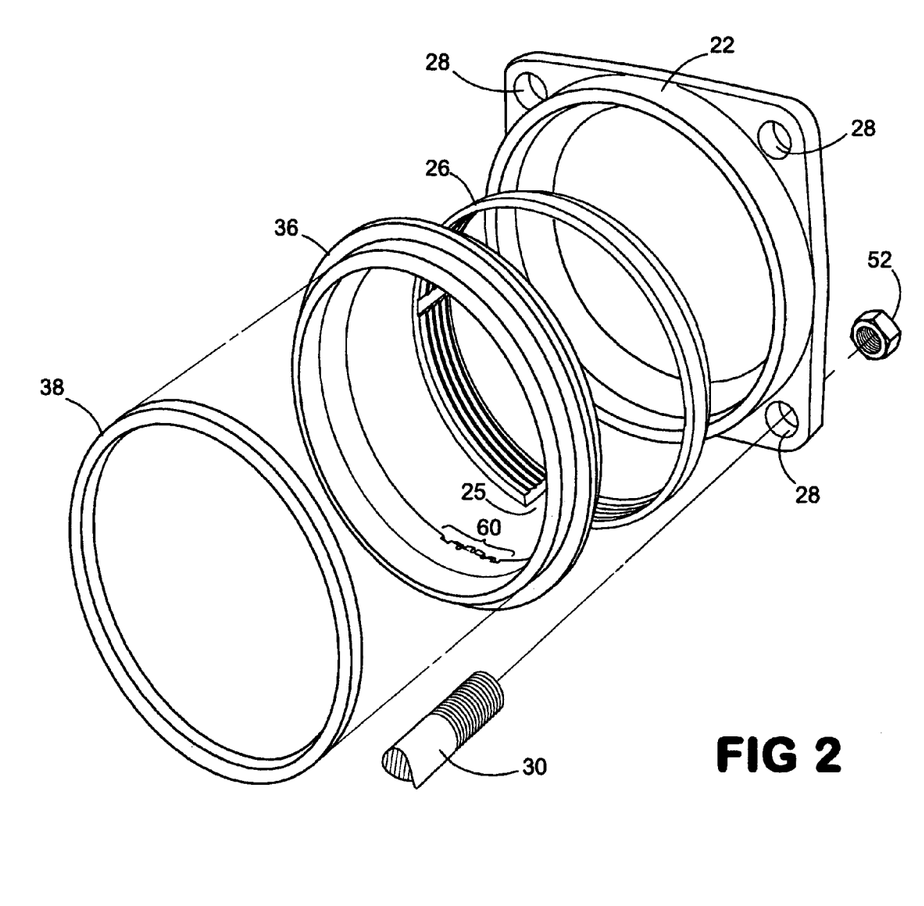
FIG. 2 is an exploded view showing the assembly of the sealing elements of an embodiment of the present invention.

The arrangement of the sealing elements is illustrated in the exploded view of FIG. 2. As shown, gripper ring 26 is positioned adjacent to locking ring 22, and intermediate ring 36 is positioned between gripper ring 26 and sealing gasket 38. In operation, the sealing elements abut one another and compress sealing gasket 38 forming a fluid tight seal between pipe 12 and coupling sleeve 14 as described herein below. Intermediate ring 36 includes a restraining member 60 that communicates with slot 25 on gripper ring 26 and prevents gripper ring 26 from engaging the pipe 12 until after sealing gasket 38 has been compressed.

Figure 3:
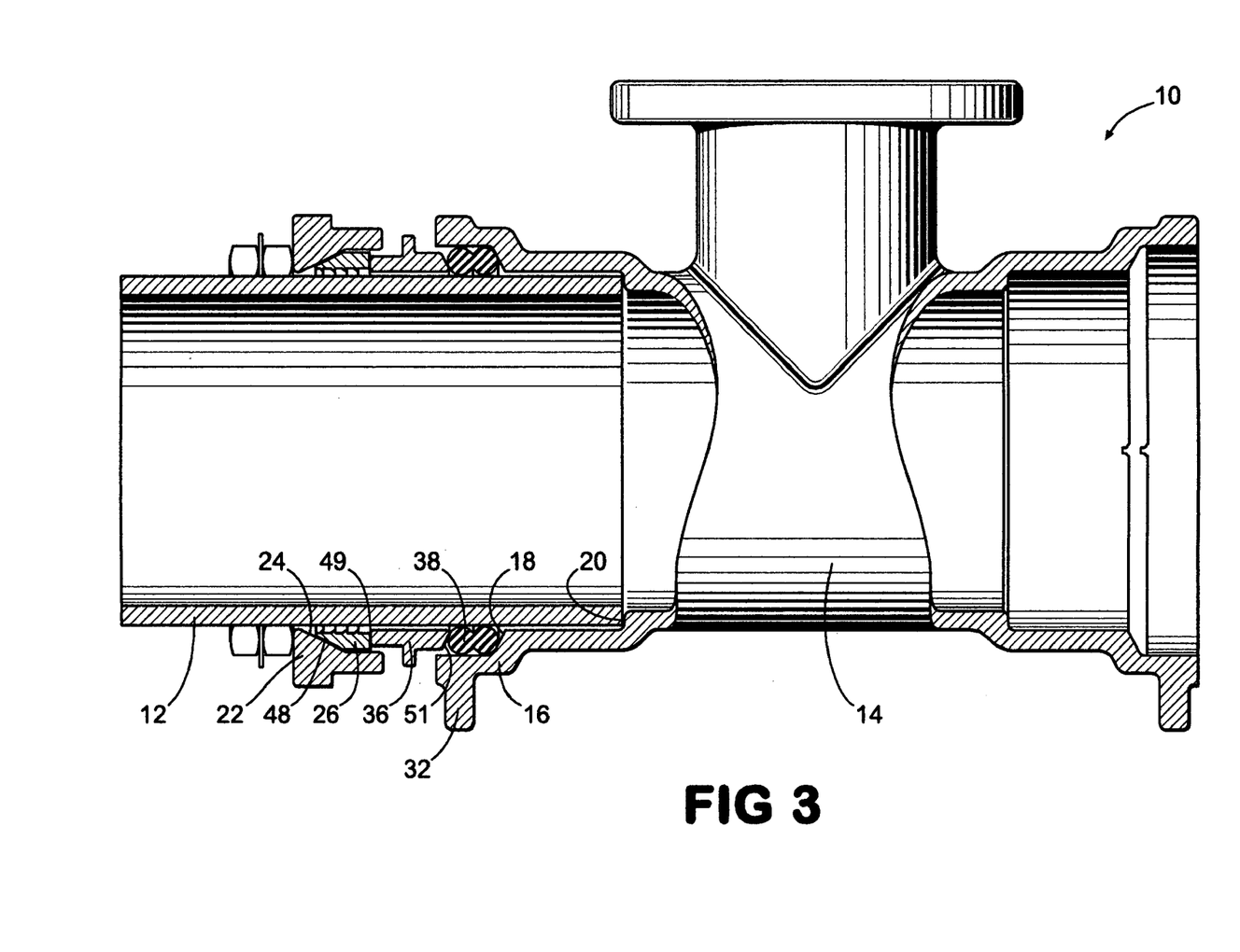
FIG. 3 is a cross sectional view of the assembled pipe coupling device before the tightening bolts are tightened with the restraining member intact and the sealing gasket uncompressed.

FIG. 3 shows a cross sectional view of pipe coupling 10 for two pipe ends one of which is shown at 12 inserted into a coupling sleeve 14. It will be understood that this view is symmetrical about the center of the sleeve 14 and only the left end elements of the coupling 10 are illustrated, the opposite ends being identical. The coupling sleeve 14 is provided with an enlarged end 16 which includes a slanted interior wall 18 and a pipe end seat 20. Such an arrangement provides a gap, or sealing cavity, around pipe 12 for placement of a sealing gasket 38. Coupling sleeve 14 further includes a continuous flange, or two or more flanges 32, outside enlarged end 16, which are apertured to receive tightening bolts or fasteners as described below.

The coupling device 10 includes a locking ring 22 which surrounds and abuts a gripper ring 26, which is in communication with an intermediate ring 36, which abuts a sealing gasket 38, which abuts the slanting wall 18 of the sleeve end 16. The locking ring 22 has two or more bores 28 for receiving tightening bolts 30 so that the bolts will each extend through a bore 28 and through the aperture in the flange 32. Preferably, the bolts 30 have an anchoring portion or catch (not shown) opposite the threaded end to facilitate engagement between the locking ring 22 and flange(s) 32 of sleeve 14 as nuts 52 are tightened. With this arrangement, tightening of the nuts 52 on the threaded ends of the bolts 30 secures the sealing elements together and assures a fluid tight seal.

The radial interior surface 24 of the locking ring 22 is slanted to cooperate with a complementary surface 48 on the gripper ring 26. The gripper ring 26 has a longitudinally extending gasp or slot 25 with a predetermined width to accommodate reduction of the circumference of gripper ring 26 upon coaxial compression of gripper ring 26 by the radial interior of locking ring 22 due to the cooperation of slanted surface 24 and complementary surface 48. The radial inner surface of gripper ring 26 further includes a plurality of gripping members or teeth (40, 42, 44, and 46) extending radially inwardly and adapted to engage the outer surface of pipe 12 upon coaxial compression of gripper ring 26. Preferably, each tooth is provided with a radially extending surface and an angled backup surface which meet to form an inner edge. Accordingly, the width of slot 25 may be compressed from a first position (FIGS. 6 and 7) where the radial inner surface of the gripper ring does not engage or grip the pipe 12 to a second position (FIG. 8) where slot 25 has a smaller width and the radial inner surface of the gripper ring engages or grips the surface of pipe 12.

The end of the gripper ring 26 opposite the complementary surface 48 is preferably flat or planar to provide a stable engagement with the planar surface 49 of the intermediate ring 36. To improve the compression of the sealing gasket 38, the opposite side 51 of the intermediate ring 36 is slanted substantially to the same degree as the opposite wall 18 of the sleeve 14. The surface 51 and the wall 18 together further define the sealing cavity, around pipe 12, for the sealing gasket 38 where the sealing gasket 38 is compressed between the surface 51 and the wall 18 when the nuts 52 are tightened on the end of the bolts 30. Thus, once the sealing gasket 38 is compressed between surface 51 and wall 18, the radial expansion of the sealing gasket 38 will substantially assure leak proof operation of the sealing gasket 38.

Figure 6:
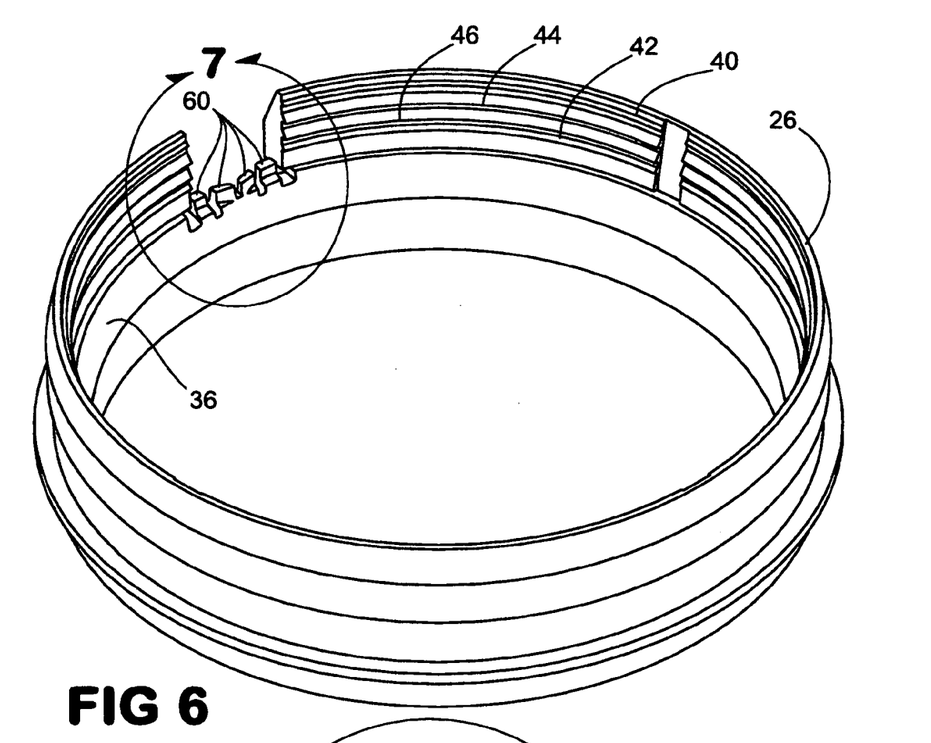
FIG. 6 is a perspective view of the gripper ring in contact with the restraining member of the intermediate ring.
Figure 7:
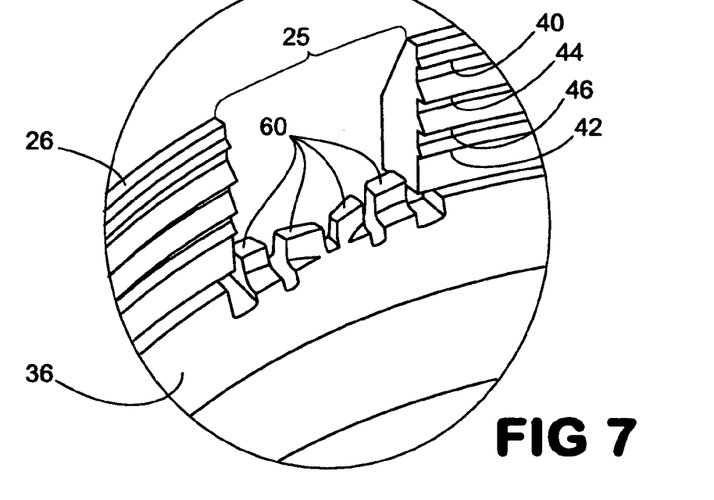
FIG. 7 is an expanded view of the gripper ring in contact with the restraining member of the intermediate ring.

Intermediate ring 36 further includes a restraining member 60 (FIGS. 2, and 6–7) that prevents gripper ring 26 from engaging the pipe 12 and locking the coupling in place until a proper seal has been achieved. The restraining member 60 may be carried by intermediate ring 36 as a separate component or may be integral with intermediate ring 36. Restraining member 60 is aligned with slot 25 on gripper ring 26 for position within slot 25 during compression. Restraining member 60 has a predetermined retention force for preventing coaxial compression of the gripper ring until sufficient force is applied to disengage restraining member 60. The force required to compress slot 25 from its first position (FIGS. 6 and 7) to its second position (FIG. 8) and move gripping ring 26 into gripping engagement with the pipe 12 by disengaging restraining member 60 is greater than the compressible force of the sealing gasket 38. Restraining member 60 may be at least one break-off member as shown in FIGS. 2, 6, and 7 or at least one deformable member designed to bend or crush rather than break off.

With the coupling established in FIG. 3, an operator will commence tightening and securing the coupling by tightening the nuts 52 on the bolts 30. Initially, this will result in sliding movement of the gripper ring 26 and the intermediate ring 36 over the surface of the pipe 12 to result in the compression of the sealing gasket 38. This is due to the fact that the force required to compress the sealing gasket 38 is less than that required to dislocate the break-off members 60 (FIGS. 2, 6, and 7) of the intermediate ring. Continued tightening of the nuts 52 will increase the force exerted on the break-off members 60 and will eventually result in the disengagement of at least one of the break-off members 60. This process is illustrated between FIGS. 3–5 and is described as follows.

FIG. 3 shows the coupling 10 prior to the tightening of the nuts 52. Slot 25 of the gripper ring 26 is in contact with the break-off members 60 which prevents the gripper ring 26 from radially contracting and engaging the surface of pipe 12. At this time, slot 25 is in the first position (FIGS. 6 and 7) and the sealing gasket 38 is not compressed. Upon initiating the tightening of nuts 52 on bolts 30, the gripper ring 26 and intermediate ring 36 will begin advancing in the direction of sealing gasket 38 for eventual compression of sealing gasket 38.

Figure 4:
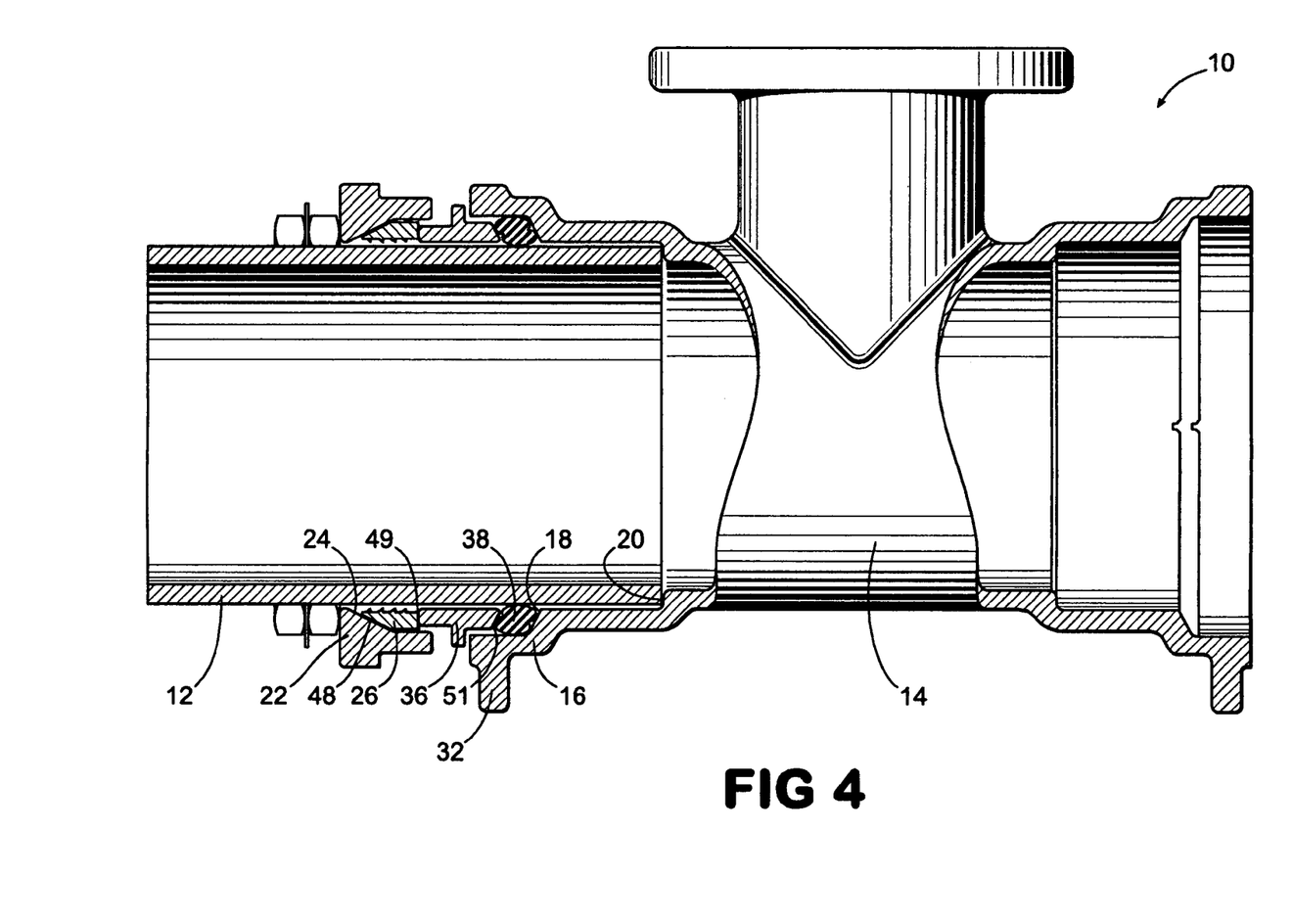
FIG. 4 is a cross sectional view of the assembled pipe coupling device where the tightening bolts have been partially tightened and the sealing gasket is compressed but the restraining member remains intact preventing full engagement of the gripper members with the pipe.
Figure 5:
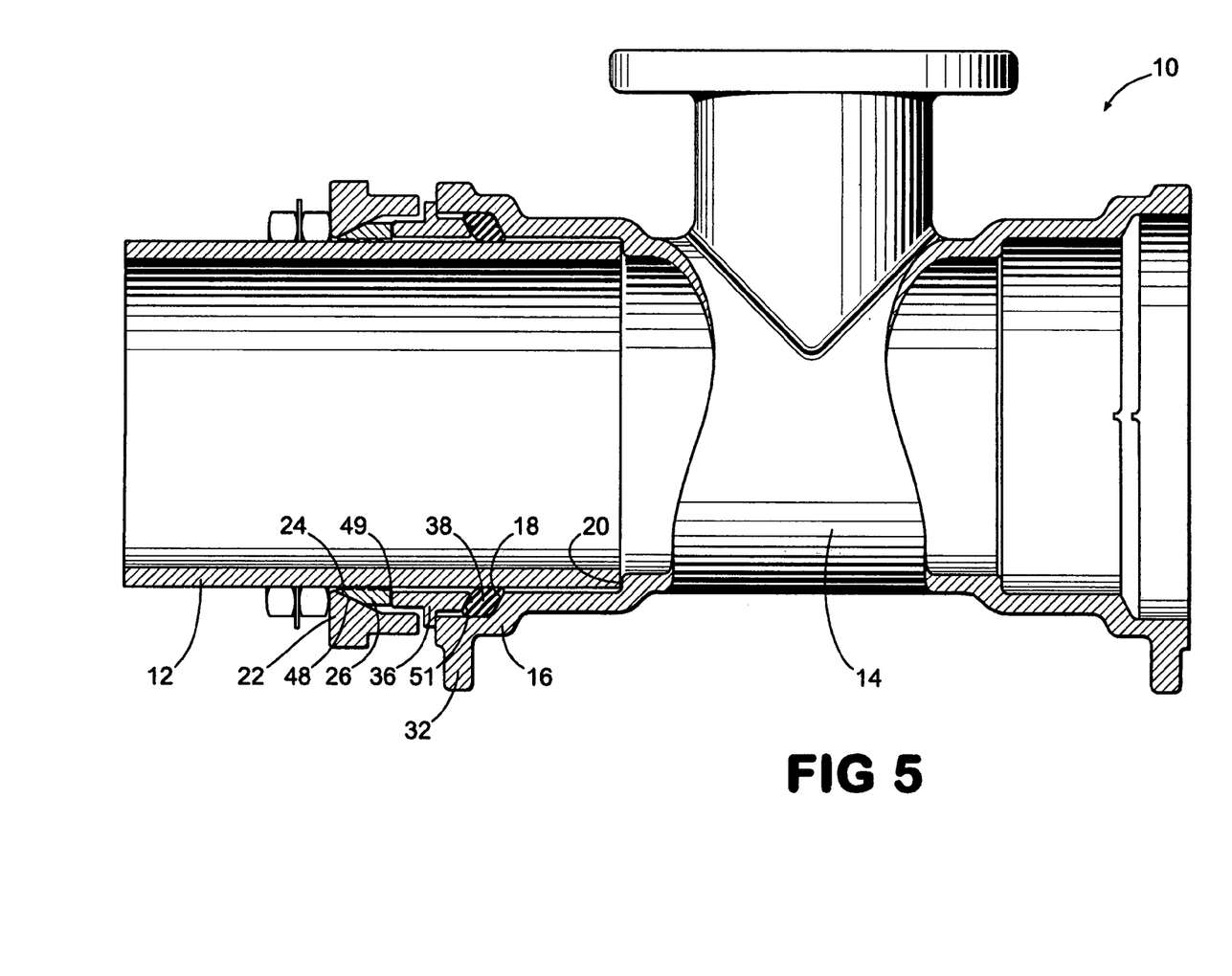
FIG. 5 is a cross sectional view of the assembled pipe coupling where the tightening bolts have continued to be tightened and the sealing gasket is compressed and the gripping members are engaging the pipe.
Figure 8:
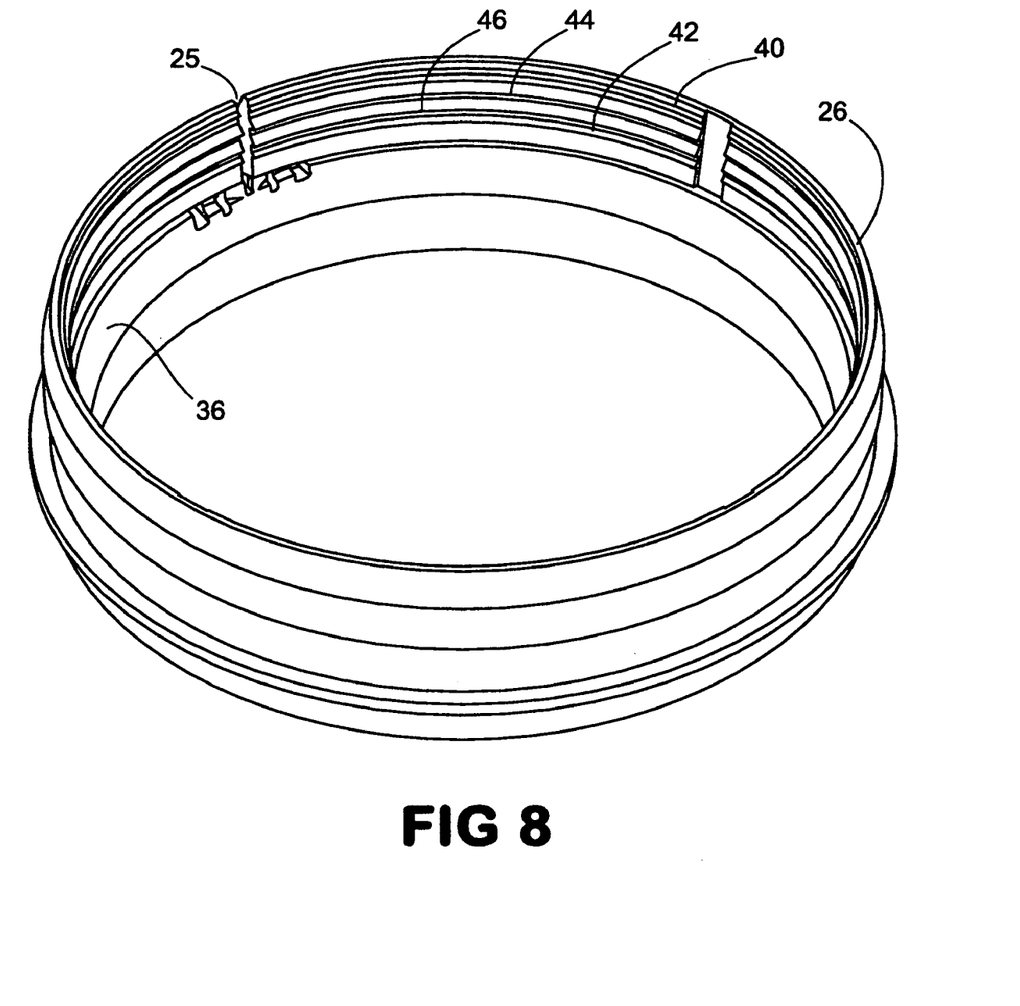
FIG. 8 is a perspective view of the gripper ring after the restraining member has disengaged the gripper ring.

FIG. 4 shows the coupling 10 after the partial tightening of the nuts 52. The sealing gasket 38 is compressed; however, slot 25 of the gripper ring 26 is still in contact with the break-off members 60 (as shown in FIGS. 6 and 7) and gripper ring 26 is not engaged with the surface of pipe 12. As the nuts are further tightened, additional force is transferred to the gripper ring 26 increasing the force exerted by the gripper ring 26 at slot 25 on the break-off members because the sealing gasket 38 is already compressed. Once a sufficient force is applied to the break-off members 60, at least one or more of the break-off members dislocates from the intermediate ring 36 which decreases the width of slot 25 (FIG. 8) and allows the gripper ring 26 to engage the surface of pipe 12 as exhibited by FIG. 5 which shows the tightened assembly of the coupling 10. It should be noted that although FIG. 8 shows that all of the break-off members have dislocated from intermediate ring 36 allowing slot 25 to be compressed to a narrower width, the degree of compression of slot 25 varies according to the outer diameter of the pipe in relation to the inner diameter of gripper ring. Accordingly, all of the break-off members 60 need not necessarily dislocate from the intermediate ring 36 before gripper ring 26 engages the surface of pipe 12.

In one embodiment illustrated in FIGS. 6–7, the present invention will also provide a unique set of teeth 40, 42, 44, and 46 on the gripper ring 26. These teeth radially extend to different heights with teeth 40 and 42 extending to a slightly smaller height than teeth 44 and 46. This difference is preferably on the order of 0.02 in. This allows for the teeth that are closer to the axial center of the gripper ring 26 to engage the pipe before the teeth at the axial edge of the gripper ring 26. This arrangement of teeth height also allows for one type of gripper ring to be used to ensure secure gripping with either plastic or metal pipes. As such, this embodiment may conveniently be used with ductile iron, PVC, or polyethylene pipes. In addition, this type of arrangement will allow substantially uniform compression of sealing gasket 38 over a wider range of conditions. Thus, the teeth provide uniform, positive restraint around the circumference of the pipe to prevent pullout caused by ground movement and/or pressure surges.

Sealing gasket 38 may be in the form of a variety of different cross sectional shapes. For instance, sealing gasket 38 may have a cross sectional shape that matches the shape of the sealing cavity. Sealing gasket 38 may also be a simple O-ring. Preferably gasket 38 has a filled figure eight cross sectional shape similar to that of a pair of O-rings joined together. Two O-rings or other gaskets with the same or similar cross sectional shapes may also be used. The coupling device of the present invention may also be provided as a stab-fit system so that no disassembly of parts is required for installation of the coupling. Accordingly, an operator need only insert the pipe and tighten the fasteners to install the coupling. In addition, the coupling device may also be provided with breakaway nuts where the top nut breaks away when the connection is properly tightened. This eliminates the guesswork of bolt tightening and torquing, improves the ease of installation, and decreases installation time. Intermediate ring 36 and restraining member 60 may also be utilized as a restraining assembly incorporated into other compression type couplings which utilize a gripping ring and a compressible seal.

Numerous characteristics and advantages have been set forth in the foregoing description, together with details of structure and function. While the invention has been disclosed in its preferred form, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved especially as they fall within the breadth and scope of the claims here appended.

What is claimed is:

1. A pipe coupling device comprising:
   a sleeve having an end adapted for receiving a pipe, said end of said sleeve having a sealing cavity defined between the outer surface of the pipe and the interior surface of said end;
   a sealing gasket adapted for arrangement within said sealing cavity of said sleeve for compression into sealing engagement with the pipe;
   a gripper ring adapted for encircling the pipe, said gripper ring having a radial inner surface having a plurality of gripping members for gripping the pipe upon coaxial compression of said gripper ring;
   an intermediate ring adapted for encircling the pipe between said sealing gasket and said gripper ring, said intermediate ring having a restraining member adapted for restraining said gripper ring to prevent said gripping members of said gripper ring from gripping the pipe until after said sealing gasket is compressed into sealing engagement with the pipe;
   a locking ring adapted for communication with said gripper ring; and
   at least two tightening members adapted for connecting said sleeve and said locking ring to compressibly secure said gripper ring, said intermediate ring, and said sealing gasket to the pipe, such that upon the tightening of said tightening members said sealing gasket is compressed into sealing engagement followed by the gripping of the pipe by said gripper ring;
   wherein said restraining member comprises at least one break-off member adapted to break off from said intermediate ring after said sealing gasket is compressed into sealing engagement with the pipe.

2. The pipe coupling device of claim 1, wherein said gripping members comprise inwardly extending teeth members.

3. The pipe coupling device of claim 2, wherein said teeth members extend radially inwardly to different heights.

4. The pipe coupling device of claim 1, wherein said sleeve further comprises a flange having at least two bore holes defining apertures for receiving said fastener members.

5. The pipe coupling device of claim 1, wherein said locking ring includes at least two bore holes defining apertures for receiving said fastener members.

6. The pipe coupling device of claim 1, wherein said fastening members comprise bolts and nuts.

7. The pipe coupling device of claim 1, wherein said locking ring has a radial inner slanted surface which surrounds and abuts said gripper ring.

8. The pipe coupling device of claim 1, wherein said gripper ring has a radial exterior surface, a portion of which is complementary to said radial inner slanted surface of said locking ring.

9. The pipe coupling device of claim 1, wherein said sealing gasket has a cross sectional shape of a filled figure eight.

10. The pipe coupling device of claim 1, wherein said sealing gasket comprises a pair of O-rings.

11. A pipe coupling device comprising:
    a sleeve having an enlarged end, said enlarged end having a first internal diameter and a slanting wall leading to a smaller second internal diameter adapted for receiving a pipe, wherein a sealing cavity is defined between the outer surface of the pipe and the first internal diameter of the enlarged end;
    a compressible sealing gasket adapted for arrangement within said sealing cavity of said sleeve for compression into sealing engagement with the pipe;
    a gripper ring adapted for encircling the pipe, said gripper ring having a radial inner gripping surface with a predetermined inner diameter and a longitudinally extending slot to accommodate the subsequent reduction of said inner diameter of said gripper ring and gripping of the pipe by said gripping surface upon coaxial compression of said gripper ring;
    an intermediate ring adapted for encircling the pipe between said compressible sealing gasket and said gripper ring, said intermediate ring having a restraining member adapted for restraining said slot of said gripper ring to prevent the subsequent reduction of said inner diameter of said gripper ring until after said compressible sealing gasket is compressed into sealing engagement with said pipe;

a locking ring adapted for communication with said gripper ring; and at least two tightening members adapted for connecting said sleeve and said locking ring to compressibly secure said gripper ring, said intermediate ring, and said sealing gasket to the pipe, such that upon the tightening of said tightening members said compressible sealing gasket is compressed into sealing engagement followed by the gripping of the pipe by said gripper ring;

wherein said restraining member comprises at least one break-off member adapted to break off from said intermediate ring after said sealing gasket is compressed into sealing engagement with the pipe.

12. The coupling device of claim 11, wherein said gripping surface comprises a plurality of gripping teeth extending radially inwardly.

13. The coupling device of claim 12, wherein said plurality of teeth extend to different heights.

14. The coupling device of claim 13, wherein said fastening members comprise bolts and nuts.

15. A restraining assembly for a compression type pipe coupling, said pipe coupling having a sleeve adapted for receiving a pipe, a sealing gasket adapted for arrangement within said sleeve for compression into sealing engagement with the pipe, a gripper ring adapted for encircling and gripping the pipe upon coaxial compression of said gripper ring, a locking ring adapted for communication with said gripper ring, and at least two tightening members adapted for connecting said sleeve and said locking ring to compressibly secure said gripper ring and said sealing gasket to the pipe, wherein said restraining assembly comprises;

an intermediate ring adapted for encircling the pipe between said sealing gasket and said gripper ring;

a restraining member carried by said intermediate ring, said restraining member adapted for restraining said gripper ring to prevent said gripper ring from gripping the pipe until after said sealing gasket is compressed into sealing engagement with the pipe;

wherein said restraining member comprises at least one break-off member adapted to break off from said intermediate ring after said sealing gasket is compressed into sealing engagement with the pipe;

wherein upon the tightening of said tightening members said sealing gasket is compressed into sealing engagement followed by the gripping of the pipe by said gripper ring.

16. The restraining assembly of claim 15, wherein said intermediate ring and said restraining member are one integral member.

* * * * *